(12) United States Patent
Bagheri et al.

(10) Patent No.: US 11,902,973 B2
(45) Date of Patent: *Feb. 13, 2024

(54) METHOD AND APPARATUS FOR DOWNLINK RESOURCE ALLOCATION FOR MULTI-TRANSMISSION AND RECEPTION POINT TRANSMISSION

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US); Tyler Brown, Lake Zurich, IL (US); Khalid Zeineddine, Evanston, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,818

(22) Filed: Jun. 6, 2022

(65) Prior Publication Data

US 2022/0304028 A1    Sep. 22, 2022

Related U.S. Application Data

(63) Continuation of application No. 16/832,314, filed on Mar. 27, 2020, now Pat. No. 11,357,030.
(Continued)

(51) Int. Cl.
*H04W 72/12* (2023.01)
*H04L 5/00* (2006.01)
(Continued)

(52) U.S. Cl.
CPC ....... *H04W 72/1273* (2013.01); *H04L 5/0051* (2013.01); *H04L 5/10* (2013.01); *H04W 72/23* (2023.01)

(58) Field of Classification Search
CPC . H04W 72/1273; H04W 72/23; H04W 72/04; H04L 5/0051; H04L 5/10; H04L 5/0048; H04L 5/0023; H04B 7/0413
(Continued)

(56) References Cited

U.S. PATENT DOCUMENTS

2018/0343653 A1* 11/2018 Guo .................. H04W 4/70
2019/0246395 A1*  8/2019 Huang ............. H04W 72/0446
(Continued)

*Primary Examiner* — Candal Elpenord
(74) *Attorney, Agent, or Firm* — Loppnow & Chapa

(57) ABSTRACT

A configuration of a set of transmission configuration indicator (TCI) states associated with a serving cell is received for a physical downlink shared channel (PDSCH) transmission, each TCI state of the set of TCI states corresponds to one or more parameters for configuring a quasi-co-location (QCL) relationship between one or more downlink reference signals and one or more downlink reference signal ports associated with the PDSCH transmission. A physical downlink control channel (PDCCH) including a downlink control information (DCI) scheduling a PDSCH for the PDSCH transmission is received. A medium access control-control element (MAC-CE) is received indicating at least two configured TCI states of the set of TCI states. The at least two configured TCI states are selected based on a timing offset between a reception of the PDCCH and a reception of the PDSCH satisfying a threshold.

16 Claims, 6 Drawing Sheets

Related U.S. Application Data

(60) Provisional application No. 62/824,981, filed on Mar. 27, 2019.

(51) Int. Cl.
*H04L 5/10* (2006.01)
*H04W 72/04* (2023.01)
*H04W 72/1273* (2023.01)
*H04W 72/23* (2023.01)

(58) Field of Classification Search
USPC .................................................. 370/329–330
See application file for complete search history.

(56) References Cited

U.S. PATENT DOCUMENTS

| | | | |
|---|---|---|---|
| 2020/0077369 A1* | 3/2020 | Zhang | H04W 72/0446 |
| 2020/0221485 A1* | 7/2020 | Cirik | H04L 25/0226 |
| 2020/0337058 A1* | 10/2020 | Song | H04L 5/0094 |
| 2021/0014884 A1* | 1/2021 | Yang | H04B 7/0695 |
| 2021/0045141 A1* | 2/2021 | Lee | H04L 5/0023 |

\* cited by examiner

300

| j | f(j) |
|---|---|
| 0 | 0 |
| 2 | 1a |
|   | 1b |
| 4 | 2a |
|   | 2b |
| 6 | 3 |
| 8 | 4 |
| 1 | 5a |
|   | 5b |
| 3 | 6a |
|   | 6b |
| 5 | 7 |
| 7 | 8 |
| 9 | 9 |

| j | f(j) |
|---|---|
| 0 | 0 |
| 2 | 1 |
| 1 | 2 |
| 3 | 3 |

FIG. 4

| j | f(j) |
|---|---|
| 0 | 0a / 0b |
| 2 | 1a / 1b |
| 1 | 2a / 2b |
| 3 | 3a / 3b |

FIG. 5

METHOD AND APPARATUS FOR DOWNLINK RESOURCE ALLOCATION FOR MULTI-TRANSMISSION AND RECEPTION POINT TRANSMISSION

FIELD OF THE INVENTION

The present disclosure is directed to a method and apparatus for downlink resource allocation for multi-TRP transmission, and more particularly instances in which non-overlapping frequency resources are associated with different transmission configuration indicator states, and/or where the transmission configuration indicator states indicated by the downlink control information may not be applicable.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

At any given time, the conditions related to establishing and maintaining a communication connection between the wireless communication device and the network via a particular cell can change as the relationship between the particular wireless communication device and the one or more base stations change. In some of these same and other instances, the degree to which a communication connection can change or the manner in which the communication connection is expected to adapt can be dependent upon the type of communication connection. At least one type of emerging communication connection includes any particular user device being able to connect to the network via potentially more than one access point and/or via one or more separate antenna elements at one or more access points. This is sometimes referred to as multi-TRP or multiple transmission reception point.

Initially, this concept was considered in connection with support for communications for cell edge users, but is increasingly being looked at more broadly for other communication conditions, such as in support for MIMO or multiple input multiple output type communications, where both the transmitter and the receiver have multiple antenna receiving elements. However, each transmission/reception point potentially has a unique set of conditions that need to be identified and used relative to the transmission or receipt of information via the particular transmission/reception point. Alternatively, in some cases, where the various antenna elements are considered as being quasi-colocated, some or all of the previously identified information related to a particular transmission/reception point may be reused or shared with another one of the transmission/reception points. Some of these communications may be identified as an ultra reliable low latency type of communication.

The present inventors have recognized that by better managing the use and selection of information, such as transmission configuration indicator states associated with the potentially multiple transmission and reception points, that communications between a particular user and the network may be improved including instances in which non-overlapping frequency resources are associated with different transmission configuration indicator states, or when transmission configuration indicator states indicated by downlink control information may not be applicable.

SUMMARY

The present application provides a user equipment. The user equipment includes a controller and a transceiver that receives a configuration of a set of transmission configuration indicator (TCI) states associated with a serving cell for a physical downlink shared channel (PDSCH) transmission, each TCI state of the set of TCI states corresponds to one or more parameters for configuring a quasi-co-location (QCL) relationship between one or more downlink reference signals and one or more downlink reference signal ports associated with the PDSCH transmission. The transceiver further receives a physical downlink control channel (PDCCH) including a downlink control information (DCI) scheduling a physical downlink shared channel (PDSCH) for the PDSCH transmission. The transceiver still further receives a medium access control-control element (MAC-CE) indicating at least two configured TCI states of the set of TCI states. The controller selects the at least two configured TCI states of the set of TCI states indicated in the received MAC-CE based on a timing offset between a reception of the PDCCH and a reception of the PDSCH satisfying a threshold, wherein at least one configured TCI state of the at least two configured TCI states corresponds to a QCL-TypeD. The at least two configured TCI states are different. The controller further decodes the PDSCH based on the selected at least two configured TCI states of the set of TCI states.

According to another possible embodiment, a method in a user equipment is provided. The method includes receiving a configuration of a set of transmission configuration indicator (TCI) states associated with a serving cell for a physical downlink shared channel (PDSCH) transmission, each TCI state of the set of TCI states corresponds to one or more parameters for configuring a quasi-co-location (QCL) relationship between one or more downlink reference signals and one or more downlink reference signal ports associated with the PDSCH transmission. A physical downlink control channel (PDCCH) including a downlink control information (DCI) scheduling a physical downlink shared channel (PDSCH) for the PDSCH transmission is received. A medium access control-control element (MAC-CE) is received indicating at least two configured TCI states of the set of TCI states. The at least two configured TCI states of the set of TCI states indicated in the received MAC-CE is selected based on a timing offset between a reception of the PDCCH and a reception of the PDSCH satisfying a threshold, wherein at least one configured TCI state of the at least two configured TCI states corresponds to a QCL-TypeD. The at least two configured TCI states are different. The PDSCH is decoded based on the selected at least two configured TCI states of the set of TCI states.

These and other objects, features, and advantages of the present application are evident from the following descrip-

BRIEF DESCRIPTION OF THE DRAWINGS

FIG. 3 is a further exemplary table identifying an association of physical resource block bundles with one or more precoders including an association of some partial bundles;

FIG. 4 is a still further exemplary table identifying an association of physical resource block bundles with one or more precoders;

FIG. 5 is yet a still further exemplary table identifying an association of physical resource block bundles with one or more precoders;

DETAILED DESCRIPTION OF THE PREFERRED EMBODIMENT(S)

Figures 1, 2:
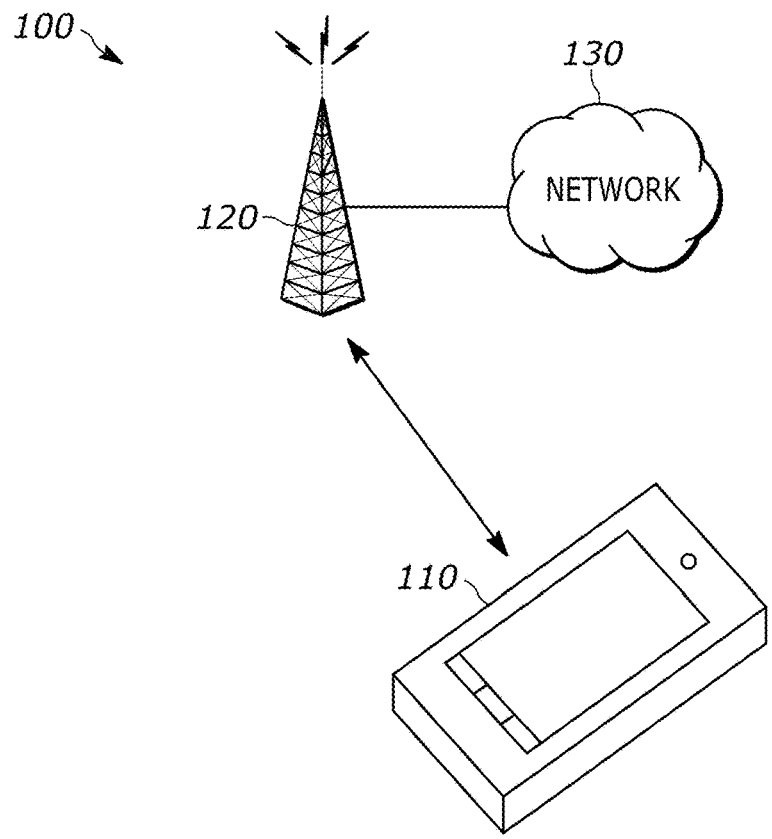
FIG. 1 is a block diagram of an exemplary network environment in which the present invention is adapted to operate.
FIG. 2 is an exemplary table identifying an association of physical resource block (PRB) bundles with one or more precoders.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for downlink resource allocation for multi-transmission and reception point (TRP) transmission.

For a multi-TRP physical downlink shared channel (PDSCH) scenario wherein non-overlapping frequency resources are associated with different transmission configuration indicator (TCI) states, one or more methods are provided, which can include defining resource allocation type one (e.g., defined via parameters $RB_{start}$, $L_{RBs}$), defining precoding resource block group (PRGs) partitions, and extending 'wideband' PRG definition.

For a multi-TRP PDSCH scenario, one or more methods are provided, which can include how to determine TCI states when TCI states indicated by downlink control information (DCI) are not applicable.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Fifth generation (5G) wireless systems are expected to provide connectivity for a wide range of applications. 3GPP follows this vision where the 5G New Radio (NR) design considers three different service categories: enhanced mobile broadband (eMBB) addressing human-centric use cases for access to multimedia content, services and data, massive machine type communications (mMTC) for a very large number of connected devices typically transmitting a relatively low volume of non-delay-sensitive data, and ultra-reliable low-latency communications (URLLC) that can have strict requirements, in terms of latency and reliability. This is aligned with the International Telecommunication Union (ITU) requirements for IMT 2020.

In 3GPP, the performance target for URLLC transmission for control plane latency is 10 ms, and it is 0.5 ms for user plane latency for downlink and uplink directions, separately. The mobility interruption time is 0 ms for both intra-frequency and inter-frequency handovers for intra-New Radio (NR) mobility. Reliability is defined as success probability of transmitting a predefined number of bytes within a certain delay. The requirement on the latter depends on the usage scenario. For example, the target reliability for the general URLLC case is 99.999% percent with user plane latency of 1 ms and payload size of 32 bytes.

In accordance with at least some existing systems, such as according to TS 38.214 V15.4.0, a user equipment (UE) can be higher-layer configured with a list of up to M TCI-State configurations to decode PDSCH intended for the UE in a serving cell, where M depends on the UE capability. Each TCI-State contains parameters for configuring a quasi-co-location (QCL) relationship between one or two downlink reference signals (DL RS) and the demodulation reference signal (DM-RS) ports of the physical downlink shared channel (PDSCH). The quasi co-location relationship is configured by the higher layer parameter qcl-Type1 for the first DL RS, and qcl-Type2 for the second DL RS (if configured). For the case of two DL RSs, the QCL types should not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread};
'QCL-TypeB': {Doppler shift, Doppler spread};
'QCL-TypeC': {Doppler shift, average delay}; and
'QCL-TypeD': {Spatial Rx parameter}.

According to TS 38.214 V15.4.0, if a UE is configured with the higher layer parameter tci-PresentInDCI that is set as 'enabled' for the control resource set (CORESET) scheduling the PDSCH, the UE assumes that the transmission configuration indication (TCI) field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the downlink (DL) DCI and the corresponding PDSCH is equal to or greater than a threshold Threshold-Sched-Offset, where the threshold is based on reported UE capability, for determining PDSCH antenna port quasi co-location, the UE assumes that the TCI state or the QCL assumption for the PDSCH is identical to the TCI state or QCL assumption whichever is applied for the CORESET used for the physical downlink control channel (PDCCH) transmission. If the tci-PresentInDCI is set as 'enabled', the TCI field in DCI in the scheduling component carrier points to the activated TCI states in the scheduled component carrier or DL bandwidth part (BWP) and when the PDSCH is scheduled by DCI format 1_1, the UE should use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability.

In 3GPP, candidate schemes for multi-TRP based URLLC, scheduled by single DCI at least, are as follows:

Scheme 1 (SDM): n (n<=$N_s$) TCI states within the single slot, with overlapped time and frequency resource allocation
Scheme 1a:
Each transmission occasion is a layer or a set of layers of the same transport block (TB), with each layer or layer set is associated with one TCI and one set of DMRS port(s).
Single codeword with one redundancy version (RV) is used across all spatial layers or layer sets. From the UE perspective, different coded bits are mapped to different layers or layer sets with the same mapping rule as in Rel-15.
Scheme 1b:
Each transmission occasion is a layer or a set of layers of the same TB, with each layer or layer set is associated with one TCI and one set of DMRS port(s).
Single codeword with one RV is used for each spatial layer or layer set. The RVs corresponding to each spatial layer or layer set can be the same or different.
for further study (FFS): codeword-to-layer mapping when total number of layers <=4.
Scheme 1c:
One transmission occasion is one layer of the same TB with one DMRS port associated with multiple TCI state indices, or one layer of the same TB with multiple DMRS ports associated with multiple TCI state indices one by one.
Applying different MCS/modulation orders for different layers or layer sets can be discussed.

Scheme 2 (FDM): n (n<=$N_f$) TCI states within the single slot, with non-overlapped frequency resource allocation.
Each non-overlapped frequency resource allocation is associated with one TCI state.
Same single/multiple DMRS port(s) are associated with all non-overlapped frequency resource allocations.
Scheme 2a:
Single codeword with one RV is used across full resource allocation. From UE perspective, the common RB mapping (codeword to layer mapping as in Rel-15) is applied across full resource allocation.
Scheme 2b:
Single codeword with one RV is used for each non-overlapped frequency resource allocation. The RVs corresponding to each non-overlapped frequency resource allocation can be the same or different.
Applying different modulation and coding schemes (MCS)/modulation orders for different non-overlapped frequency resource allocations can be discussed.
Details of frequency resource allocation mechanism for FDM 2a/2b with regarding to allocation granularity, time domain allocation can be discussed.

Scheme 3 (TDM): n (n<=$N_{t1}$) TCI states within the single slot, with non-overlapped time resource allocation.
Each transmission occasion of the TB has one TCI and one RV with the time granularity of mini-slot.
All transmission occasion(s) within the slot use a common MCS with same single or multiple DMRS port(s).
RV/TCI state can be same or different among transmission occasions.
FFS channel estimation interpolation across mini-slots with the same TCI index.

Scheme 4 (TDM): n (n<=$N_{t2}$) TCI states with K (n<=K) different slots.
Each transmission occasion of the TB has one TCI and one RV.
All transmission occasion(s) across K slots use a common MCS with same single or multiple DMRS port(s).
RV/TCI state can be same or different among transmission occasions.
FFS channel estimation interpolation across slots with the same TCI index.

Note that M-TRP/panel based URLLC schemes should be compared in terms of improved reliability, efficiency, and specification impact.

Note: Support of number of layers per TRP may be discussed

In accordance with at least some embodiments of the present disclosure, the TCI state or the QCL assumption for the PDSCH can be used inter-changeably. Solutions are applicable to both slot/mini-slot.

Frequency Resource Allocation Type 1

According to TS 38.214:

In downlink resource allocation of type 1, the resource block assignment information indicates to a scheduled UE a set of contiguously allocated non-interleaved or interleaved virtual resource blocks within the active bandwidth part of size $N_{BWP}^{size}$ except for the case when DCI format 1_0 is decoded in any common search space in which case the size of CORESET 0 should be used if CORESET 0 is configured for the cell and the size of initial DL bandwidth part should be used if CORESET 0 is not configured for the cell.

A downlink type 1 resource allocation field includes a resource indication value (RIV) corresponding to a starting virtual resource block ($RB_{start}$) and a length in terms of contiguously allocated resource blocks $L_{RBs}$. The resource indication value is defined by if $(L_{RBs}-1) \le \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size}-L_{RBs}+1) + (N_{BWP}^{size}-1-RB_{start})$ where $L_{RBs} \ge 1$ and should not exceed $N_{BWP}^{size} - RB_{start}$.

When the DCI size for DCI format 1_0 in USS is derived from the size of DCI format 1_0 in common search space (CSS) but applied to another active BWP with size of $N_{BWP}^{active}$, a downlink type 1 resource block assignment field includes a resource indication value (RIV) corresponding to a starting resource block $RB_{start}=0, K, 2 \cdot K, \ldots, (N_{BWP}^{initial}-1) \cdot K$ and a length in terms of virtually contiguously allocated resource blocks $L_{RBs}=K, 2 \cdot K, \ldots, N_{BWP}^{initial} \cdot K$, where $N_{BWP}^{initial}$ is given by
- the size of CORESET 0 if CORESET 0 is configured for the cell;
- the size of initial DL bandwidth part if CORESET 0 is not configured for the cell.

The resource indication value is defined by:

if $(L'_{RBs}-1) \leq \lfloor N_{BWP}^{initial}/2 \rfloor$ then $$RIV = N_{BWP}^{initial}(L'_{RBs}-1) + RB'_{start}$$

else $$RIV = N_{BWP}^{initial}(N_{BWP}^{initial}-L'_{RBs}+1) + (N_{BWP}^{initial}-1-RB'_{start})$$

where $L'_{RBs}=L_{RBs}/K$, $RB'_{start}=RB_{start}/K$ and where $L'_{RBs}$ should not exceed $N_{BWP}^{initial}-RB'_{start}$. If $N_{BWP}^{active} > N_{BWP}^{initial}$, K is the maximum value from set $\{1, 2, 4, 8\}$ which satisfies $K \leq \lfloor N_{BWP}^{active}/N_{BWP}^{initial} \rfloor$; otherwise K=1.

In an embodiment: if a UE is scheduled with a set of PRBs in a slot, wherein the set of PRBs is composed of 'm' non-overlapped frequency resource allocations, wherein each non-overlapped frequency resource allocation is associated with one TCI state,
- a downlink type 1 resource block assignment field can include a resource indication value (RIV) corresponding to a starting resource block RBstart=0, K, 2K, ..., (Nf-1)K, and a length in terms of virtually contiguously allocated resource blocks LRBs= K, 2K, ..., (Nf) K, where Nf=ceil($N_{BWP}^{size}$/K) (in other example: Nf=floor($N_{BWP}^{size}$/K)); and K is given by one or more of: specification/radio resource control (RRC) signaling/'m'/VRB bundle size/RBG size/PRG size/DCI indication/gap between non-overlapped frequency resource allocation;
  - in one implementation, K=m*virtual resource block (VRB) bundle size
  - in another implementation, K=m*LCM (VRB bundle size, physical resource block (PRB) bundle size); LCM stands for Least Common Multiple
  - in one implementation, for m=1 ➔ K=1
  - in another implementation, for PRG size determined as "wideband", K=m
  - in another implementation, for RBG size larger than 1; KRBG=LCM (K, RBG size); wherein K is determined by one of the schemes mentioned above; and wherein K in (Nf and LRBs) is replaced by KRBG The resource indication value is defined by:

if $(L'_{RBs}-1) \leq \lfloor N_{BWP}^{initial}/2 \rfloor$ then $$RIV = N_{BWP}^{initial}(L'_{RBs}-1) + RB'_{start}$$

else $$RIV = N_{BWP}^{initial}(N_{BWP}^{initial}-L'_{RBs}+1) + (N_{BWP}^{initial}-1-RB'_{start})$$

Where $N_{BWP}^{initial}$=Nf, $L'_{RBs}=L_{RBs}/K$, $RB'_{start}=RB_{start}/K$ and where $L'_{RBs}$ should not exceed $N_{BWP}^{initial}-RB'_{start}$.

In a related embodiment, if the DCI size is derived from the size of another DCI (e.g., DCI format 1_0 in CSS) but applied to another active BWP with size of $N_{BWP}^{active}$, a downlink type 1 resource block assignment field includes a resource indication value (RIV) corresponding to a starting resource block $RB_{start}=0, K, 2 \cdot K, \ldots, (N_{BWP}^{initial}-1)$ and a length in terms of virtually contiguously allocated resource blocks $L_{RBs}=K, 2 \cdot K, \ldots, N_{BWP}^{initial} \cdot K$, where $N_{BWP}^{initial}$ is given by
- the size of CORESET 0 if CORESET 0 is configured for the cell;
- the size of initial DL bandwidth part if CORESET 0 is not configured for the cell.

The resource indication value is defined by:

if $(L'_{RBs}-1) \leq \lfloor N_{BWP}^{initial}/2 \rfloor$ then $$RIV = N_{BWP}^{initial}(L'_{RBs}-1) + RB'_{start}$$

else $$RIV = N_{BWP}^{initial}(N_{BWP}^{initial}-L'_{RBs}+1) + (N_{BWP}^{initial}-1-RB'_{start})$$

where $L'_{RBs}=L_{RBs}/K$, $RB'_{start}=RB_{start}/K$ and where $L'_{RBs}$ should not exceed $N_{BWP}^{start}-RB'_{start}$. If $N_{BWP}^{active} > N_{BWP}^{initial}$, Kspecial is LCM(KMTRP, K), K is the maximum value from set $\{1, 2, 4, 8\}$ which satisfies $K \leq \lfloor N_{BWP}^{active}/N_{BWP}^{initial} \rfloor$; otherwise K=1; and wherein KMTRP is the K (or KRBG) value determined by the above embodiment; and wherein K in (Nf and LRBs) is replaced by Kspecial.

PRB Bundling

According to TS 38.214:

A UE may assume that precoding granularity is $P_{BWP,i}'$ consecutive resource blocks in the frequency domain. $P_{BWP,i}'$ can be equal to one of the values among $\{2, 4, wideband\}$.

If $P_{BWP,i}'$ is determined as "wideband", the UE is not expected to be scheduled with non-contiguous PRBs and the UE may assume that the same precoding is applied to the allocated resource.

If $P_{BWP,i}'$ is determined as one of the values among $\{2, 4\}$, Precoding Resource Block Group (PRGs) partitions the bandwidth part i with $P_{BWP,i}'$ consecutive PRBs. Actual number of consecutive PRBs in each PRG could be one or more.

The UE may assume the same precoding is applied for any downlink contiguous allocation of PRBs in a PRG.

When receiving PDSCH scheduled by PDCCH with DCI format 1_1 with CRC scrambled by C-RNTI, MCS-C-RNTI, or CS-RNTI, if the higher layer parameter prb-BundlingType is set to 'dynamicBundling', the higher layer parameters bundleSizeSet1 and bundleSizeSet2 configure two sets of $P_{BWP,i}'$ values, the first set can take one or two $P_{BWP,i}'$ values among $\{2, 4, wideband\}$, and the second set can take one $P_{BWP,i}'$ value among $\{2, 4, wideband\}$.

If the PRB bundling size indicator signalled in DCI format 1_1 as defined in Subclause 7.3.1.2.2 of [2, TS 38.212]
- is set to '0', the UE should use the $P_{BWP,i}'$ value from the second set of $P_{BWP,i}'$ values when receiving PDSCH scheduled by the same DCI.
- is set to '1' and one value is configured for the first set of $P_{BWP,i}'$ values, the UE should use this $P_{BWP,i}'$ value when receiving PDSCH scheduled by the same DCI
- is set to '1' and two values are configured for the first set of $P_{BWP,i}'$ values as 'n2-wideband' (corresponding to two $P_{BWP,i}'$ values 2 and wideband) or 'n4-wideband' (corresponding to two $P_{BWP,i}'$ values 4 and wideband), the UE should use the value when receiving PDSCH scheduled by the same DCI as follows:
  - If the scheduled PRBs are contiguous and the size of the scheduled PRBs is larger than $N_{BWP,i}^{size}/$ 2, $P_{BWP,i}'$ is the same as the scheduled bandwidth, otherwise $P_{BWP,i}'$ is set to the remaining configured value of 2 or 4, respectively.

When receiving PDSCH scheduled by PDCCH with DCI format 1_1 with CRC scrambled by C-RNTI, MCS-C-RNTI, or CS-RNTI, if the higher layer parameter prb-BundlingType is set to 'staticBundling', the $P_{BWP,i}'$ value is configured with the single value indicated by the higher layer parameter bundleSize.

When a UE is configured with RBG=2 for bandwidth part i according to Subclause 5.1.2.2.1, or when a UE is configured with interleaving unit of 2 for VRB to PRB mapping provided by the higher layer parameter vrb-ToPRB-Interleaver given by PDSCH-Config for bandwidth part i, the UE is not expected to be configured with $P_{BWP,i}'=4$.

i. PRG Definition

In one embodiment, if a UE is scheduled with a set of PRBs in a slot, wherein
  the set of PRBs is composed of 'm' non-overlapped frequency resource allocations, wherein each non-overlapped frequency resource allocation is associated with one TCI state
  each non-overlapped frequency resource allocation includes non-contiguous PRBs or contiguous PRBs (e.g., based on RA type 1)
  the UE determines a PRG size $P_{BWP,i}'$ (e.g., based on a configuration, and/or a DCI)
  Precoding Resource Block Group (PRGs) partitions the bandwidth part i with $P_{BWP,i}'$ semi-contiguous PRBs.
  semi-contiguous PRBs are PRBs with at most 'x' PRBs exist between two consecutive PRBs of the set of semi-contiguous PRBs
    'x' can be specified (e.g., x=2RBs or 4 RBs); can depend on the number of TCI states; can be RRC configured; can be signaled in DCI; can be a UE capability; can depend on one or more of vrb bundle size (e.g., vrb-ToPRB-Interleaver parameter in TS 38.331), PRG size, and RBG size
    In an example, if
      one TCI state is associated with the PDSCH, x=0;
      more than one TCI states are associated with the PDSCH, x=vrb bundle size, and the UE is not expected to be configured with/indicated $P_{BWP,i}'$ more than 2 RBs.
    In another example, if more than one TCI states are associated with the PDSCH, the UE does not expect to be configured with/indicated PRG size that is different than the vrb bundle size (x'=0).
    In another example, if more than one TCI states are associated with the PDSCH, x=vrb bundle size multiplied by (the number of TCI states-1)
    'x' can be different for different
      SCS: e.g., smaller SCS can have higher value of 'x' (e.g., as channel variation across RBs in frequency domain may be smaller)
      e.g., PRG size=4 RBs, vrb bundle size=2 RBs; x=2 RBs for SCS=15-30 kHz, and x=0 RBs for SCS>30 KHz
      number of layers
      $N_{BWP}^{size}$ and/or start of the bandwidth part
According to TS 38.211:
The UE should assume the virtual resource blocks are mapped to physical resource blocks according to the indicated mapping scheme, non-interleaved or interleaved mapping. If no mapping scheme is indicated, the UE should assume non-interleaved mapping.

For non-interleaved VRB-to-PRB mapping, virtual resource block n is mapped to physical resource block n, except for PDSCH transmissions scheduled with DCI format 1_0 in a common search space in which case virtual resource block n is mapped to physical resource block n+$N_{start}^{CORESET}$ where $N_{start}^{CORESET}$ is the lowest-numbered physical resource block in the control resource set where the corresponding DCI was received.

For interleaved VRB-to-PRB mapping, the mapping process is defined by:
  Resource block bundles are defined as
    for PDSCH transmissions scheduled with DCI format 1_0 with the CRC scrambled by SI-RNTI in Type0-PDCCH common search space in CORESET 0, the set of $N_{BWP,init}^{size}$ resource blocks in initial active downlink bandwidth part are divided into $N_{bundle}=\lceil N_{BWP,init}^{size}/L \rceil$ resource-block bundles in increasing order of the resource-block number and bundle number where L=2 is the bundle size and resource block bundle $N_{bundle}-1$ includes $N_{BWP,init}^{size}$ mod L resource blocks if $N_{BWP,init}^{size}$ mod L>0 and L resource blocks otherwise,
    all other resource block bundles includes L resource blocks.
    for PDSCH transmissions scheduled with DCI format 1_0 in any common search space other than Type0-PDCCH common search space in bandwidth part i with starting position $N_{BWP,i}^{start}$, the set of $N_{BWP,init}^{size}$ virtual resource blocks {0,1, . . . , $N_{BWP,init}^{size}-1$} are divided into $N_{bundle}$ virtual resource-block bundles in increasing order of the virtual resource-block number and virtual bundle number and the set of $N_{BWP,init}^{size}$ physical resource blocks ($N_{start}^{CORESET}$, $N_{start}^{CORESET}+1$, . . . , Nstart-CORESET+NBWP,initsize-1 are divided into $N_{bundle}$ physical resource-block bundles in increasing order of the physical resource-block number and physical bundle number, where $N_{bundle}=\lceil N_{BWP,init}^{size}+(N_{BWP,i}^{start}+N_{start}^{CORESET}) \mod L)/L \rceil$, L=2 is the bundle size, and $N_{start}^{CORESET}$ is the lowest-numbered physical resource block in the control resource set where the corresponding DCI was received.
    resource block bundle 0 includes L-(($N_{BWP,i}^{start}+N_{start}^{CORESET}$)mod L) resource blocks,
    resource block bundle $N_{bundle}-1$ includes ($N_{BWP,init}^{size}+N_{start}^{CORESET}$) mod L resource blocks if ($N_{BWP,init}^{size}+N_{BWP,i}^{start}+N_{start}^{CORESET}$) mod L>0 and L resource blocks otherwise,
    all other resource block bundles includes L resource blocks.
    for all other PDSCH transmissions, the set of $N_{BWP,i}^{size}$ resource blocks in bandwidth part i with starting position $N_{BWP,i}^{start}$ are divided into $N_{bundle}=\lceil (N_{BWP,i}^{size}+(N_{BWP,i}^{start} \mod L_i))/L_i \rceil$ resource-block bundles in increasing order of the resource-block number and bundle number where $L_i$ is the bundle size for bandwidth part i provided by the higher-layer parameter vrb-ToPRB-Interleaver and
    resource block bundle 0 includes $L_i-(N_{BWP,i}^{start} \mod L_i)$ resource blocks,
    resource block bundle $N_{bundle}-1$ includes ($N_{BWP,i}^{start}+N_{BWP,i}^{size}$)mod$L_i$ resource blocks if ($N_{BWP,i}^{start}+N_{BWP,i}^{size}$)mod$L_i>0$ and $L_i$ resource blocks otherwise, all other resource block bundles includes $L_i$ resource blocks.

Virtual resource blocks in the interval $j \in \{0, 1, \ldots, N_{bundle}-1\}$ are mapped to physical resource blocks according to virtual resource block bundle $N_{bundle}-1$ is mapped to physical resource block bundle $N_{bundle}-1$ virtual resource block bundle $j \in \{0, 1, \ldots, N_{bundle}-2\}$ is mapped to physical resource block bundle f(j) where $f(j) = rC + c$ $j = cR + r$ $r = 0, 1, \ldots, R-1$ $c = 0, 1, \ldots, C-1$ $R = 2$ $C = \lfloor N_{bundle}/R \rfloor$ The UE is not expected to be configured with $L_i = 2$ simultaneously with a PRG size of 4 as defined in [6, TS 38.214]

If no bundle size is configured, the UE should assume $L_i = 2$.

The UE may assume that the same precoding in the frequency domain is used within a PRB bundle and the bundle size is determined by clause 5.1.2.3 in [6, TS 38.214]. The UE should not make any assumption that the same precoding is used for different bundles of common resource blocks.

In an example, $N_{BWP}^{size} = 20$ RBs; RBstart=0, L=2; $P_{BWP,i}' = 4$; VRB bundle j is mapped to PRB bundle f(j); each bundle is composed of two contiguous PRBs. The mapping is shown in the table below: for PRG size of 4 RBs, PRB bundles 0 and 2 share the same precoder, PRB bundles 1, and 3 share the same precoder and so on (each color represents PRB bundles sharing the same precoder). In the table shown in FIG. 2, x=2 PRBs.

FIG. 2 illustrates an exemplary table 200 identifying an association of physical resource block (PRB) bundles with one or more precoders.

In the exemplary embodiment, the UE is not expected to be configured with VRB bundle size $L_i = 2$ simultaneously with a PRG size of 4, if the PDSCH is associated with a single TCI, and based on factors such as one or more of UE capability/higher layer parameters/number of TCI states associated with PDSCH/PRG size, etc; the UE may be configured with VRB bundle size $L_i = 2$ simultaneously with a PRG size of 4 if the PDSCH is associated with more than one TCI states.

In another example, $N_{BWP}^{size} = 20$ RBs; RBstart=0, L=2; $P_{BWP,i}' = 4$; x=1 RB.

In this example, PRB bundle 0, and top halves of PRB bundles 1, and 2 share the same precoder; bottom halves of PRB bundles 1 and 2, and the whole PRB bundle 3 share the same precoder, and so on.

FIG. 3 illustrates a further exemplary table 300 identifying an association of physical resource block bundles with one or more precoders including an association of some partial bundles.

In a further example, $N_{BWP}^{size} = 20$ RBs; RBstart=0, L=4; $P_{BWP,i}'4$.

FIG. 4 illustrates a still further exemplary table 400 identifying an association of physical resource block bundles with one or more precoders.

In a still further example, $N_{BWP}^{size} = 20$ RBs; RBstart=0, L=4; $P_{BWP,i}' = 2$.

Figure 5:
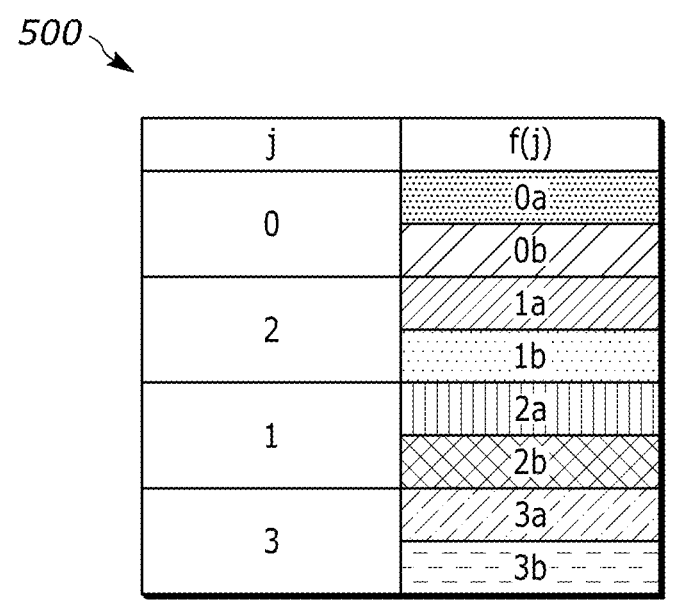

FIG. 5 is yet a still further exemplary table 500 identifying an association of physical resource block bundles with one or more precoders.

In one example (e.g., with interleaved VRB-to-PRB mapping), even numbered virtual resource block (VRB) bundles are associated with a first TCI state (e.g., a first TRP) and odd numbered virtual resource block (VRB) bundles are associated with a second TCI state (e.g., a second TRP). Adjacent VRB bundle indices are spaced by C, e.g., $c = \lfloor N_{bundle}/R \rfloor$ PRB bundles where R=2 with interleaved VRB-to-PRB mapping. The PRBs associated with the same TCI state are contiguous. In one example, R is the number of TCI states associated with the PDSCH (e.g., for the same TB (transport block)).

In one example, the PDSCH is associated with R TCI states, and virtual resource block bundle $j \in \{i+(0, R, 2R \ldots, N_{bundle}-R)\}$ in set i are associated with a TCI state i, $i = 0, 1, \ldots, R-1$. The virtual resource block bundle $j \in \{0, 1, \ldots, N_{bundle}-2\}$ is mapped to physical resource block bundle f(j) where $f(j) = rC + c$ $j = cR + r$ $r = 0, 1, \ldots, R-1$ $c = 0, 1, \ldots, C-1$ $C = \lfloor N_{bundle}/R \rfloor$ The VRB bundle to PRB bundle interleaver is a block interleaver with number of rows=R, and writing column-wise and reading row-wise. In one example, the spacing or offset between adjacent VRB bundle indices may be indicated to the UE in higher-layer signaling or in DCI (e.g., based on indication of value of C in the equation or indication of the value of $N_{bundle}$).

In one example (e.g., with non-interleaved VRB-to-PRB mapping), a first portion (e.g., first half of allocated VRBs, ceil(N/2), where N is the number of VRBs assigned for transmission) of virtual resource blocks (VRB) are associated with a first TCI state (e.g., a first TRP) and a second portion (e.g., second half of allocated VRBs, N-ceil(N/2) or floor(N/2)) of virtual resource blocks are associated with a second TCI state (e.g., a second TRP).

In one example, the mapping of the block of complex-valued symbols $y^{(p)}(0), \ldots, y^{(p)}(M_{symb}^{ap}-1)$ to resource elements $(k', l)_{p,\mu}$ allocated for PDSCH according to [TS 38.214] and not reserved for other purposes should be in increasing order of first the index k' over the assigned virtual resource blocks associated with the same TCI state, where k'=0 is the first subcarrier in the lowest-numbered virtual resource block assigned for transmission associated with the same TCI state, and then the index l. In one example, the mapping to resource elements $(k', l)_{p,\mu}$ is first over the assigned virtual resource blocks associated with the first TCI state, and then over the assigned virtual resource blocks associated with the second TCI state. In one example, the block of complex-valued symbols correspond to a single codeword with one RV and is mapped across all the assigned virtual resource blocks, i.e., virtual resource blocks associated with the first TCI state and the second TCI state. In another example, a first block of complex-valued symbols corresponding to a first codeword with a first RV is mapped to resource elements $(k', l)_{p,\mu}$ over the assigned virtual resource blocks associated with the first TCI state; and a second block of complex-valued symbols corresponding to a second codeword with a second RV is mapped to resource elements $(k', l)_{p,\mu}$ over the assigned virtual resource blocks associated with the second TCI state. The first and second codeword are associated with the same TB.

ii. Wideband PRG

In an embodiment, if a UE is scheduled with a set of PRBs in a slot, wherein
- the set of PRBs is composed of 'm' non-overlapped frequency resource allocations, wherein each non-overlapped frequency resource allocation is associated with one TCI state
- the UE determines a PRG size $P_{BWP,i}'$ (e.g., based on a configuration, and/or a DCI)
- If $P_{BWP,i}'$ is determined as "wideband", the UE is not expected to be scheduled with non-contiguous PRBs associated with a TCI state and the UE may assume that the same precoding is applied to the allocated resource associated with the TCI state.

In a related embodiment, which could be applicable to non-interleaved RA type1 for instance, the UE can be scheduled with non-contiguous PRBs but PRBs associated with each TCI state are contiguous. The offset between the non-contiguous PRBs (e.g., between the 'm' non-overlapped frequency resource allocations) is determined based on one or more of:
- signaling (e.g., via RRC and/or DCI)
  - in one implementation, an RRC parameter (e.g., a new parameter or an already used parameter such as vrb-ToPRB-Interleaver which can potentially get new values) configures a unit of offset and DCI indicates how many units of offset make the offset between the 'm' non-overlapped frequency resource allocations.
  - In another implementation, a unit of offset is fixed in the specifications (e.g., as a function of the total allocated resource), and the DCI signals the offset between the 'm' non-overlapped frequency resource allocations.
  - In another implementation, an RRC parameter configures a set of possible offset values (may include offset '0' RB), and DCI selects one of the possible offset values to be the offset between the 'm' non-overlapped frequency resource allocations.
  - In another implementation, an RRC parameter configures a set of possible fraction values (e.g., {¼, ½}), and DCI selects one of the possible fraction values; the offset between the 'm' non-overlapped frequency resource allocations is then determined based on the fraction value multiplied by the [total] allocated resource (number of RBs/RBGs/PRGs);
- The offset is zero
- Number of TCI states
- PRG/RBG size In a related embodiment, the UE can be scheduled with non-contiguous PRBs but PRBs associated with each TCI state are contiguous. If the determined offset between the non-contiguous PRBs (e.g., between the 'm' non-overlapped frequency resource allocations) is "G" RBs, the RBs corresponding to each of the 'm' non-overlapped frequency resource allocation are determined based on the total allocated resource, 'm'/number of TCI states, and 'G'.
- In one example, a nominal number of RBs corresponding to each of the 'm' non-overlapped frequency resource allocation is determined based on the floor([total allocated resource-(m-1)×G]/m)

TCI State Determination when TCI States Indicated by DCI are not Applicable

According to TS 38.214: If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET.

If
- (a) tci-PresentInDCI is not configured for the CORESET scheduling the PDSCH or
- (b) the PDSCH is scheduled by a DCI format 1_0, and the time offset between the reception of the DL DCI and the corresponding PDSCH is equal to or greater than a threshold Threshold-Sched-Offset, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission.

According to TS 38.214:
For Both the Cases when
- (a) tci-PresentInDCI is set to 'enabled' and
- (b) tci-PresentInDCI is not configured in RRC connected mode, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.

In this case, if the 'QCL-TypeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers). If none of configured TCI states contains 'QCL-TypeD', the UE should obtain the other QCL assumptions from the indicated TCI states for its scheduled PDSCH irrespective of the time offset between the reception of the DL DCI and the corresponding PDSCH.

According to TS 38.306:
timeDurationForQCL
Defines minimum number of OFDM symbols required by the UE to perform PDCCH reception and applying spatial QCL information received in DCI for PDSCH processing as described in TS 38.214 [12] clause 5.1.5, i.e. Threshold-Sched-Offset. UE should indicate one value of the minimum number of OFDM symbols per each subcarrier spacing of 60 kHz and 120 kHz.

In an embodiment, a UE is scheduled via a PDCCH to receive a PDSCH, if the DCI associated with the PDCCH does not convey TCI/QCL information for PDSCH antenna port quasi co-location or the indicated TCI/QCL information is not applicable (e.g., due to some timing constraints), the UE may assume that the
- TCI state or the QCL assumption for the PDSCH is identical to the TCI state or QCL assumption whichever is applied for the CORESET used for the PDCCH transmission (PDCCH reception by UE) for single-TRP operation.

TCI states or the QCL assumptions for the PDSCH are derived based on the TCI state or QCL assumption whichever is applied for the CORESET used for the PDCCH transmission (reception by UE) for multi-TRP operation (e.g., in scheme 2 of multi-TRP transmission discussed above; when the number of non-overlapping sets of resources is greater than one).

In one example, a CORESET may be associated with two TCI states (first TCI state and second TCI state, more generally R TCI states). In one example, the two TCI states may be indicated in the MAC-CE. In another example, the TCI state tuple (first TCI state, second TCI state) combination may be configured by higher layers (e.g., RRC) and the MAC-CE indication of the TCI state for PDCCH only indicates the first TCI state. The UE uses the first TCI state for PDCCH reception. If only the first TCI state is configured for the CORESET, the UE assumes the PDSCH scheduled by the PDCCH received on the CORESET is for single-TRP operation. The TCI state or the QCL assumption for the PDSCH is identical to the TCI state or QCL assumption (first TCI state) whichever is applied for the CORESET, or the first TCI state of the CORESET associated with a monitored search space with the lowest CORESET-ID in the latest slot depending on the conditions described above. If the first TCI state, and second TCI state is configured for the CORESET, the UE assumes the PDSCH scheduled by the PDCCH received on the CORESET is for multi-TRP operation. The TCI state or the QCL assumption for the PDSCH from the first TRP is identical to the TCI state or QCL assumption (first TCI state) whichever is applied for the CORESET or the first TCI state of the CORESET associated with a monitored search space with the lowest CORESET-ID in the latest slot depending on the conditions described above, and the PDSCH from the second TRP is identical to the TCI state or QCL assumption of the second TCI state associated with the CORESET.

In a related embodiment, for multi-TRP operation, the UE assumes the TCI state or the QCL assumption for the PDSCH repetition associated with a first TRP, is identical to the
  TCI state or QCL assumption whichever is applied for the CORESET used for the PDCCH transmission; or
  the UE may assume that the DM-RS ports of the first PDSCH repetition of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.

a second TRP,
  is identical to the TCI state or QCL assumption whichever is applied for one of the following
    the most recent monitored CORESET in a previous slot/mini-slot; or
    a second strongest receiver beam/reference signals (CSI-RS or SS block); the UE may indicate the reference signal ID corresponding to the second strongest receiver beam/reference signal (as well as first strongest) to the network (e.g., in periodic manner/occasions); or
  is determined based on a related TCI state or QCL assumption to that of the first TRP
    e.g., a higher layer TCI state relation can be defined between two TCI states
  or the UE may assume that the DM-RS ports of the second PDSCH repetition of a serving cell are quasi co-located with the RS(s) in the TCI state with respect to the QCL parameter(s) used for PDCCH quasi co-location indication of the CORESET associated with a monitored search space with
    the second lowest CORESET-ID in the latest slot in which one or more CORESETs within the active BWP of the serving cell are monitored by the UE; or alternatively
    the highest CORESET-ID in the latest slot in which one or more CORESETs within the active BWP of the serving cell are monitored by the UE; or alternatively
    a CORESET-ID that is related (e.g., via specification or higher layer signalling or physical layer signaling) to the lowest CORESET-ID in the latest slot in which one or more CORESETs within the active BWP of the serving cell are monitored by the UE or alternatively
    a (lowest) CORESET-ID in the second latest slot in which one or more CORESETs within the active BWP of the serving cell are monitored by the UE note: the above embodiment contains several alternatives for determining the TCI/QCL relation for different TRPs.

Resource Split Across Non-Overlapped Sets

In one embodiment, if different MCSs/number of layers used for different TRPs; the determination of the RBs belonging to different PDSCH repetitions is done based on a TBS/MCSs/number of layers. The TBS maybe determined based on the number of non-overlapped frequency resources, and the indicated/determined MCSs/number of layers.

In a related embodiment, the number of RBs for each of the 'm' non-overlapped sets of frequency allocations is determined based on the determined/indicated MCS (e.g., modulation orders can be different across sets but the target code rate can be the same). For instance, if modulation order for a first set is QPSK, and for the second set is 16QAM, the first set has 4 times resources of that of the second set.

In a related embodiment, a limited set of different modulation order/MCS is allowed across the 'm' sets (e.g., only QPSK, and 16QAM) if the MCSs are to be different. If the MCSs are the same, higher modulation orders also possible.

In a related embodiment, the smallest and the largest RB sets of the 'm' sets can be either (almost) equal to each other or (almost) twice of each other.

HARQ-ACK Feedback in Multi-Trp Transmission

In one embodiment, if a UE receives more than one codeword in a PDSCH, wherein the more than one codeword are transmitted from different TRPs with multiple TCI states and are encoded from a same transport block (TB), and wherein each of the more than one codeword is self-decodable, the UE generates HARQ-ACK feedback information for each codeword of the more than one codeword of the PDSCH. The PDSCH comprises one or more time-frequency resources for repeated PDSCH transmissions, wherein the repeated PDSCH transmissions are multiplexed in the time-, frequency-, and/or spatial domain. Separate HARQ-ACK feedback information for each codeword associated with a different TCI state but from the same TB may be beneficial, since it enables a network entity to adjust modulation and coding scheme (MCS) for each TRP (if a different MCS for each codeword is allowed) and/or dynamically change transmitting TRPs for re-transmission of the TB or the following new TB transmission, based on the HARQ-ACK feedback information of each codeword.

In one implementation, multiple HARQ-ACK feedback information are transmitted in multiple PUCCH resources, wherein each of the multiple PUCCH resources is associated with one TRP/one TCI state (i.e. received at least by the one associated TRP, e.g. PUCCH-SpatialRelationInfo' configured for a PUCCH resource of the multiple PUCCH resources and a TCI state of the multiple TCI states of the PDSCH refer to the same quasi-co-location reference signal resources). In one example, HARQ-ACK feedback information for each codeword with a TCI state is transmitted in one PUCCH resource which refers to the same QCL RS resource as the TCI state. In another example, multiple HARQ-ACK feedback information for the more than one codeword is jointly transmitted in one PUCCH resource associated with one of the multiple TCI states. This implementation uses spatial diversity for PUCCH transmissions and potentially increases reliability of HARQ-ACK feedback with an increased PUCCH resource overhead.

The UE receives an indication of multiple PUCCH resources for HARQ-ACK feedback in DCI scheduling the PDSCH. To avoid the increased size of the DCI bit field for PUCCH resource indication, the PUCCH resource indicator field value maps to one or more higher-layer configured PUCCH resource indices. Alternatively, one PUCCH resource is indicated in scheduling DCI and remaining PUCCH resources are derived based on the indicated PUCCH resource, based on configured/predefined PUCCH resource relationship or configured grouping of TCI states. For example, if the UE receives an indication of a first PUCCH resource with a first 'PUCCH-SpatialRelationInfo', then the UE selects a second and a third PUCCH resources with a second and a third 'PUCCH-SpatialRelationInfo', respectively, based on grouping of TCI states and corresponding grouping of 'PUCCH-SpatialRelationInfo'/PUCCH resources, wherein the first, second, and third 'PUCCH-SpatialRelationInfo' are in the same group.

In another implementation, HARQ-ACK bits corresponding to multiple codewords are transmitted in one PUCCH resource to reduce the PUCCH resource overhead.

In another embodiment, a UE receives information of a demodulation signal-to-interference and noise ratio (SINR) threshold value and transmits indication whether demodulation SINR for a codeword is above the threshold value along with HARQ-ACK feedback information for the codeword. For example, the UE generates HARQ-ACK feedback information for a given codeword at least with 3 states as follows:

Non-acknowledgement (NACK), demodulation SINR below a configured threshold value;
NACK, demodulation SINR above a configured threshold value;
Acknowledgement (ACK)

The above extended HARQ-ACK feedback information could be useful to indicate short-term channel blocking of a certain TRP to a network entity immediately. Receiving upon the indication that the demodulation SINR of one codeword associated with one TCI state is below the configured threshold value, the network entity can schedule re-transmission of a TB with proper combination of TCI states.

Figure 6:
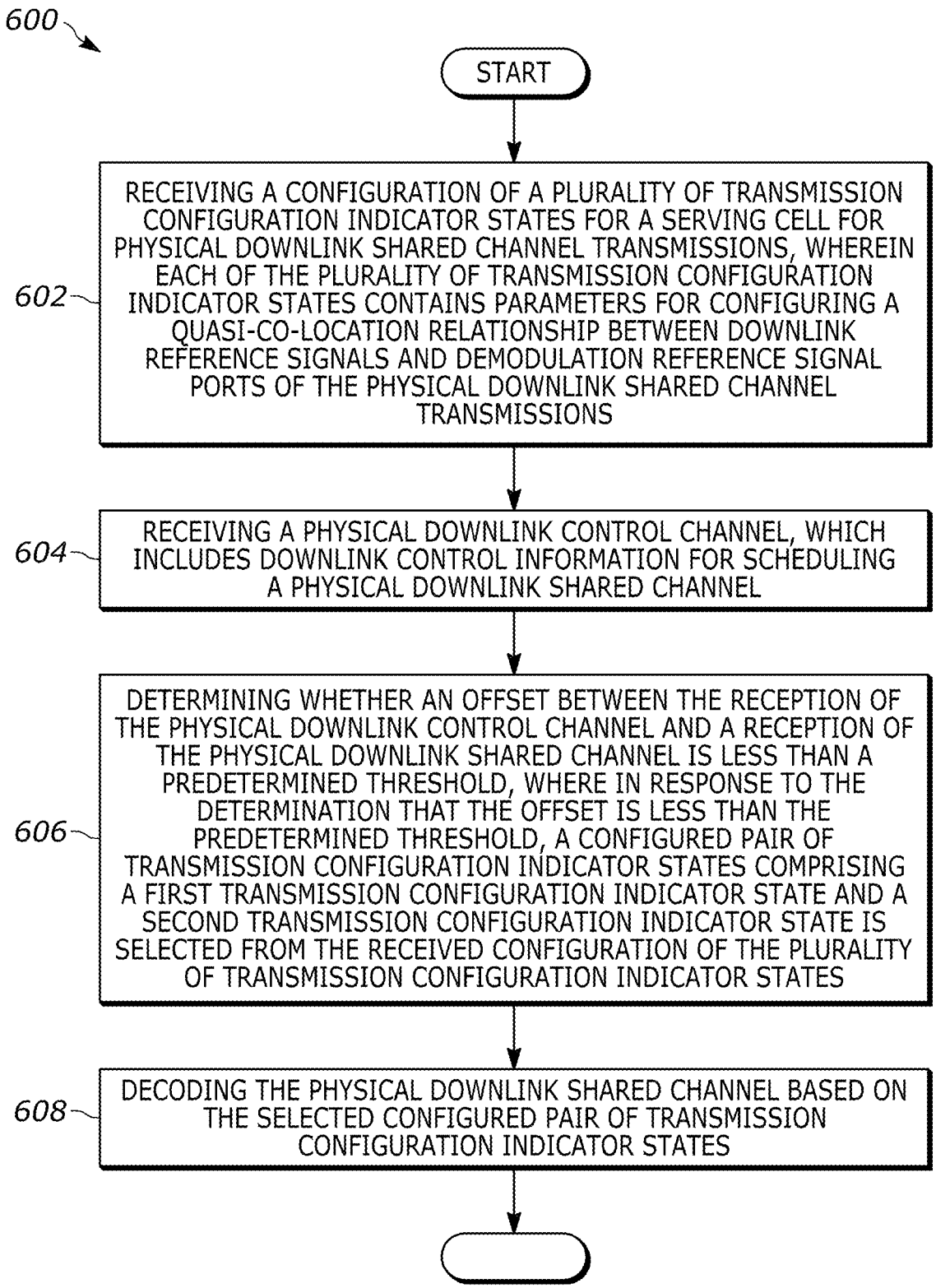
FIG. 6 is a flow diagram in a user equipment for downlink resource allocation for multi-TRP transmission.

FIG. 6 illustrates a flow diagram 600 in a user equipment for downlink resource allocation for multi-TRP transmission. The method includes receiving 602 a configuration of a plurality of transmission configuration indicator states for a serving cell for physical downlink shared channel transmissions, wherein each of the plurality of transmission configuration indicator states contains parameters for configuring a quasi-co-location relationship between downlink reference signals and demodulation reference signal ports of the physical downlink shared channel transmissions. A physical downlink control channel is received 604, which includes downlink control information for scheduling a physical downlink shared channel. A determination is made 606 as to whether an offset between the reception of the physical downlink control channel and a reception of the physical downlink shared channel is less than a predetermined threshold, where in response to the determination that the offset is less than the predetermined threshold, a configured pair of transmission configuration indicator states comprising a first transmission configuration indicator state and a second transmission configuration indicator state is selected from the received configuration of the plurality of transmission configuration indicator states. The physical downlink shared channel is decoded 608 based on the selected configured pair of transmission configuration indicator states.

In some instances, the method can further include determining whether a transmission configuration indicator field is present in the downlink control information of the received physical downlink control channel, where the transmission configuration indicator field can indicate a particular one of the plurality of transmission configuration indicator states being associated with the physical downlink shared channel. In response to a determination that the transmission configuration indicator field is absent from the downlink control information a configured pair of transmission configuration indicator states comprising the first transmission configuration indicator state and the second transmission configuration indicator state can be selected from the received configuration of the plurality of transmission configuration indicator states. In response to a determination that the transmission configuration indicator field is present in the downlink control information, the determination as to whether the offset between the reception of the physical downlink control channel and the reception of the physical downlink shared channel is less than the predetermined threshold can be made.

In some of these instances, in response to the determination that an offset between the reception of the physical downlink control channel and the reception of the physical downlink shared channel is not less than the predetermined threshold, the transmission configuration indicator state associated with the physical downlink shared channel can be based on an indication in the transmission configuration indicator field that is present in the downlink control information.

In some instances, the offset can be defined by a minimum number of orthogonal frequency division modulation symbols required by the user equipment to perform physical downlink control channel reception and applying spatial quasi-colocation information received in downlink control information for physical downlink shared channel processing.

In some instances, at least one of the plurality of transmission configuration indicator states can contain a quasi-colocation information of a type, that includes a spatial receive parameter.

In some instances, the first transmission configuration indicator state and the second transmission configuration indicator state can be different.

In some instances, determining the configured pair of transmission configuration indicator states comprising the first transmission configuration indicator state and the second transmission configuration indicator state can further include determining the configured pair of transmission configuration indicator states based on a medium access control-control element indication.

In some instances, the downlink control information of the physical downlink control channel can contain a downlink resource block assignment for scheduling a set of resource blocks in a slot for reception of the physical downlink shared channel. The method can further include determining a precoding resource block group size based on the downlink control information, the associated downlink resource block assignment, where a first portion of the set of resource blocks can be associated with the first transmission configuration indicator state. A second portion of the set of resource blocks can be associated with the second transmission configuration indicator state; wherein the first portion and the second portion are not overlapping in frequency domain. In response to determining the precoding resource block group size is wideband, where wideband includes having an assigned frequency resource spectrum allocation exceeding a predetermined wideband threshold, the physical downlink shared channel can be decoded based on an assumption that the same precoding is applied to the resource blocks associated with the first transmission configuration indicator state, and the same precoding is applied to the resource blocks associated with the second transmission configuration indicator state. In response to determining the precoding resource block group size is not wideband, the physical downlink shared channel can be decoded based on an assumption that even numbered resource block bundles are associated with the first transmission configuration indicator state, odd numbered resource block bundles are associated with the second transmission configuration indicator state, the same precoder is applied to the physical resource blocks of a precoding resource block group of the precoding resource block group size, and where a resource bundle comprises a number of resource blocks, in which the number of resource blocks equals the precoding resource block group size.

In some of these instances, the set of resource blocks include N_RB resource blocks, where the first portion can include the first $\lceil N\_RB/2 \rceil$ resource blocks, and the second portion can include the remaining $\lfloor N\_RB/2 \rfloor$ resource blocks.

In other of these instances, the method can further include determining a gap in frequency domain between the first portion and the second portion of the set of resource blocks, where the physical downlink shared channel is decoded based on the determined gap.

In some of these instances, the gap can be determined based on at least one of an associated radio resource control parameter, an indication in the associated downlink control information, and the scheduled set of resource blocks.

In some instances, a resource allocation type associated with set of resource blocks can be a downlink resource allocation of a type, which can indicate in the downlink control information a starting resource block bundle index and how many resource block bundles are scheduled.

Figure 7:
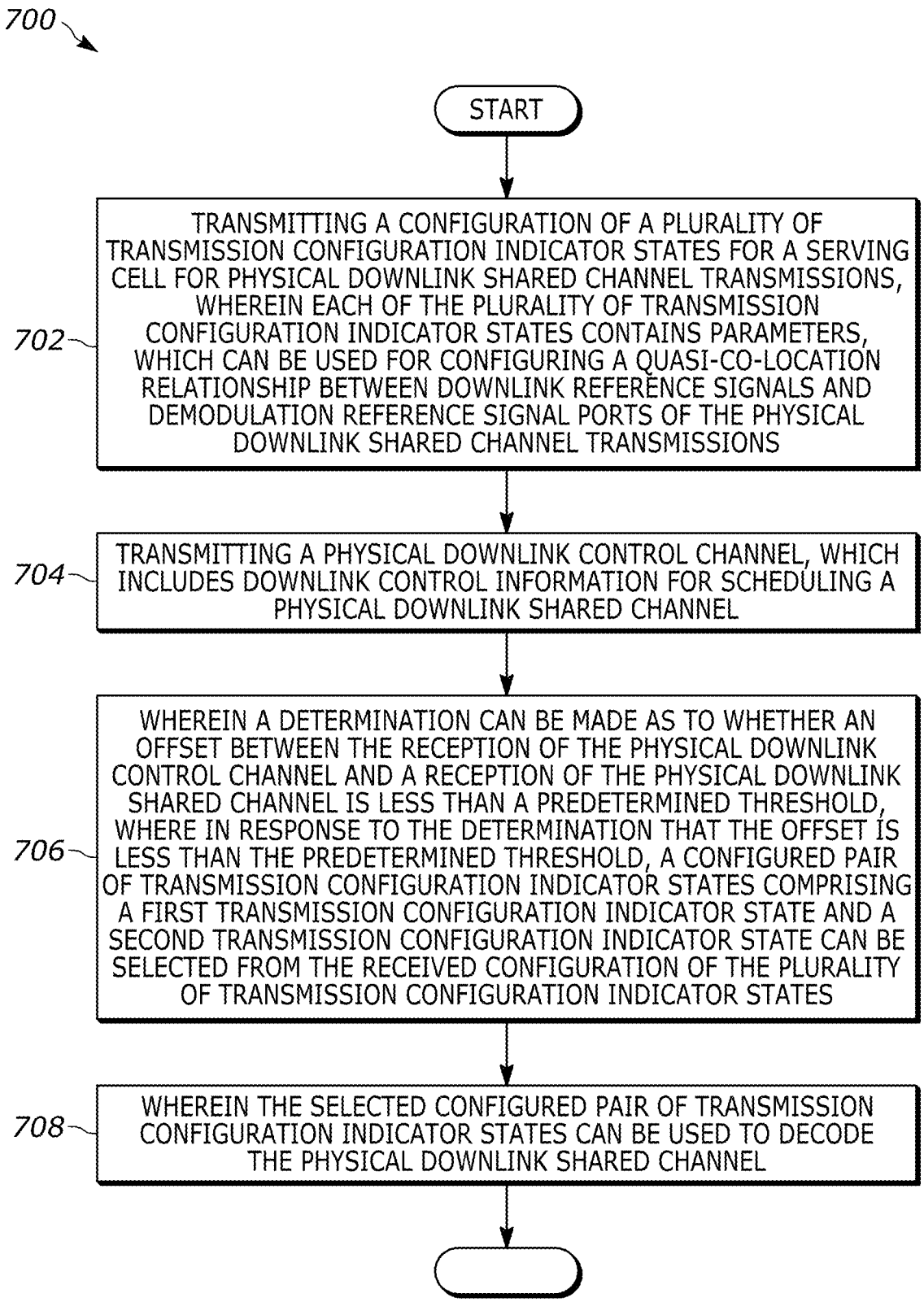
FIG. 7 is a flow diagram in a network entity for downlink resource allocation for multi-TRP transmission.

FIG. 7 illustrates a flow diagram 700 of a method in a network entity for downlink resource allocation for multi-TRP transmission. The method includes transmitting 702 a configuration of a plurality of transmission configuration indicator states for a serving cell for physical downlink shared channel transmissions, wherein each of the plurality of transmission configuration indicator states contains parameters, which can be used for configuring a quasi-co-location relationship between downlink reference signals and demodulation reference signal ports of the physical downlink shared channel transmissions. A physical downlink control channel is transmitted 704, which includes downlink control information for scheduling a physical downlink shared channel. A determination 706 can be made as to whether an offset between the reception of the physical downlink control channel and a reception of the physical downlink shared channel is less than a predetermined threshold, where in response to the determination that the offset is less than the predetermined threshold, a configured pair of transmission configuration indicator states comprising a first transmission configuration indicator state and a second transmission configuration indicator state can be selected from the received configuration of the plurality of transmission configuration indicator states. The selected configured pair of transmission configuration indicator states can be used to decode 708 the physical downlink shared channel.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
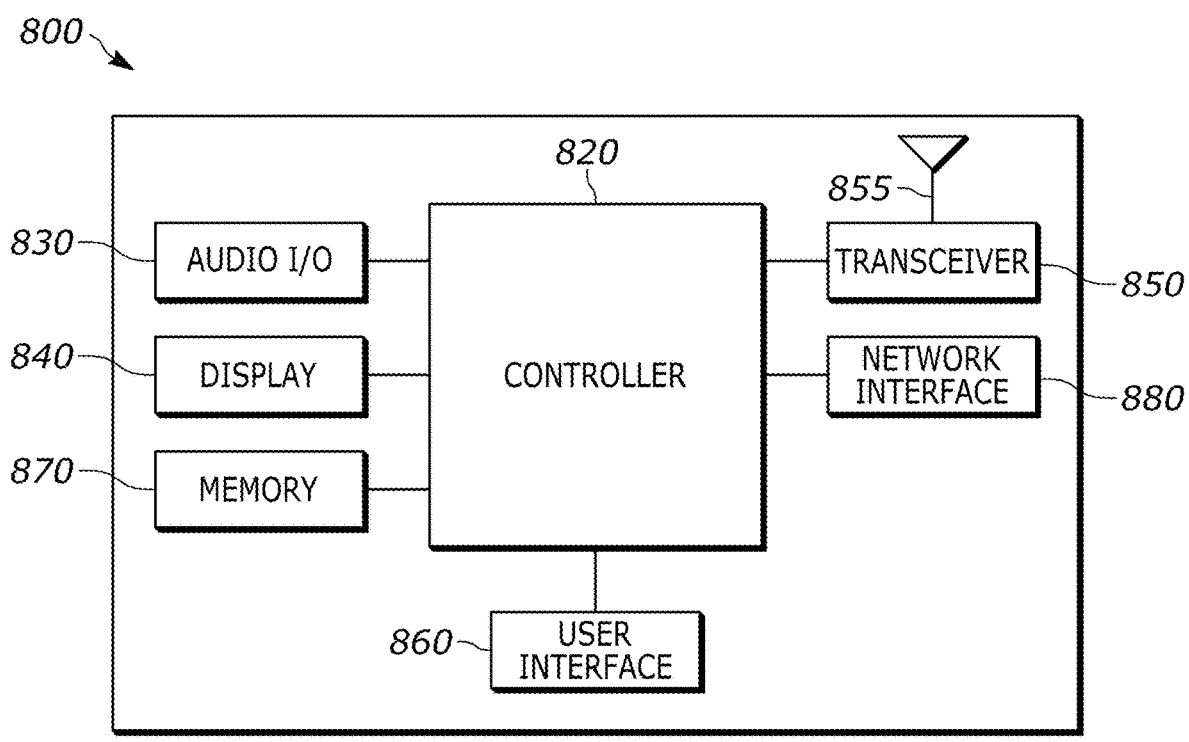
FIG. 8 is an exemplary block diagram of an apparatus according to a possible embodiment.

FIG. 8 is an example block diagram of an apparatus 800, such as the wireless communication device 110, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry.

The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a solid state memory, a flash memory, a removable memory, a hard drive, a cache, or any other memory that can be coupled to an apparatus.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments. Some or all of the additional elements of the apparatus 800 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A user equipment comprising:
   a controller;
   a transceiver that receives a configuration of a set of transmission configuration indicator (TCI) states associated with a serving cell for a physical downlink shared channel (PDSCH) transmission, each TCI state of the set of TCI states corresponds to one or more parameters for configuring a quasi-co-location (QCL) relationship between one or more downlink reference signals and one or more downlink reference signal ports associated with the PDSCH transmission;
   wherein the transceiver further receives a physical downlink control channel (PDCCH) including a downlink control information (DCI) scheduling a PDSCH for the PDSCH transmission;
   wherein the transceiver further receives a medium access control-control element (MAC-CE) indicating at least two configured TCI states of the set of TCI states;
   wherein the controller selects the at least two configured TCI states of the set of TCI states indicated in the received MAC-CE based on a timing offset between a reception of the PDCCH and a reception of the PDSCH satisfying a threshold, and based on an absence of a TCI field in the DCI, the at least two configured TCI states comprising a first configured TCI state and a second configured TCI state different than the first configured TCI state, and wherein at least one configured TCI state of the at least two configured TCI states corresponds to a QCL-TypeD; and
   wherein the controller further decodes the PDSCH based on the selected at least two configured TCI states of the set of TCI states.

2. The user equipment in accordance with claim 1, wherein the timing offset between the reception of the PDCCH and the reception of the PDSCH satisfying the threshold comprises the timing offset being less than the threshold.

3. The user equipment in accordance with claim 1, wherein the controller determines that the timing offset between the reception of the PDCCH and the reception of the PDSCH is greater than the threshold; and
   wherein the transceiver receives, in a TCI field in the DCI, an indication of the at least one configured TCI state associated with the PDSCH based on the timing offset being greater than the threshold.

4. The user equipment in accordance with claim 1, wherein the timing offset defines a minimum number of orthogonal frequency division modulation (OFDM) symbols for receiving the PDCCH and applying spatial QCL information for decoding the PDSCH, and wherein the spatial QCL information is received in the DCI.

5. The user equipment in accordance with claim 1, wherein at least one TCI state of the set of TCI states includes a QCL information of a QCL type, wherein the QCL information includes a spatial receive parameter.

6. The user equipment in accordance with claim 1, wherein the DCI includes a resource block assignment comprising a set of resource blocks for the reception of the PDSCH;

wherein the controller determines a precoding resource block group size based on the resource block assignment;

wherein the controller associates a first subset of resource blocks of the set of resource blocks with a first TCI state of the at least two configured TCI states; and wherein the controller further associates a second subset of resource blocks of the set of resource blocks with a second TCI state of the at least two configured TCI states, wherein the first subset of resource blocks and the second subset of resource blocks are non-overlapping in a frequency domain.

7. A method in a user equipment, the method comprising:

receiving a configuration of a set of transmission configuration indicator (TCI) states associated with a serving cell for a physical downlink shared channel (PDSCH) transmission, each TCI state of the set of TCI states corresponds to one or more parameters for configuring a quasi-co-location (QCL) relationship between one or more downlink reference signals and one or more downlink reference signal ports associated with the PDSCH transmission;

receiving a physical downlink control channel (PDCCH) including a downlink control information (DCI) scheduling a PDSCH for the PDSCH transmission;

receiving a medium access control-control element (MAC-CE) indicating at least two configured TCI states of the set of TCI states;

selecting the at least two configured TCI states of the set of TCI states indicated in the received MAC-CE based on a timing offset between a reception of the PDCCH and a reception of the PDSCH satisfying a threshold, and based on an absence of a TCI field in the DCI, the at least two configured TCI states comprising a first configured TCI state and a second configured TCI state different than the first configured TCI state, and wherein at least one configured TCI state of the at least two configured TCI states corresponds to a QCL-TypeD; and decoding the PDSCH based on the selected at least two configured TCI states of the set of TCI states.

8. The method in accordance with claim 7, wherein the timing offset between the reception of the PDCCH and the reception of the PDSCH satisfying the threshold comprises the timing offset being less than the threshold.

9. The method in accordance with claim 7, further comprising:

determining that the timing offset between the reception of the PDCCH and the reception of the PDSCH is greater than the threshold; and receiving, in a TCI field in the DCI, an indication of the at least one configured TCI state associated with the PDSCH based on the timing offset being greater than the threshold.

10. The method in accordance with claim 7, wherein the timing offset defines a minimum number of orthogonal frequency division modulation (OFDM) symbols for receiving the PDCCH and applying spatial QCL information for decoding the PDSCH, and wherein the spatial QCL information is received in the DCI.

11. The method in accordance with claim 7, wherein at least one TCI state of the set of TCI states includes a QCL information of a QCL type, and wherein the QCL information includes a spatial receive parameter.

12. The method in accordance with claim 7, wherein the DCI includes a resource block assignment comprising a set of resource blocks for the reception of the PDSCH; the method further comprising:

determining a precoding resource block group size based on the resource block assignment;

associating a first subset of resource blocks of the set of resource blocks with a first TCI state of the at least two configured TCI states; and associating a second subset of resource blocks of the set of resource blocks with a second TCI state of the at least two configured TCI states, wherein the first subset of resource blocks and the second subset of resource blocks are non-overlapping in a frequency domain.

13. The method in accordance with claim 12, further comprising:

decoding the PDSCH based on an assumption that a same precoding is applied to the resource blocks associated with the first TCI state of the at least two configured TCI states, and the same precoding is applied to the resource blocks associated with the second TCI state of the at least two configured TCI states, based on a determination that the precoding resource block group size is wideband, where wideband includes having an assigned frequency resource spectrum allocation exceeding a wideband threshold; and decoding the PDSCH based an assumption that even numbered resource block bundles are associated with the first TCI state of the at least two configured TCI states, odd numbered resource block bundles are associated with the second TCI state of the at least two configured TCI states, a same precoder is applied to the physical resource blocks of a precoding resource block group of the precoding resource block group size, and where a resource bundle comprises a number of resource blocks, in which the number of resource blocks equals the precoding resource block group size, based on a determination that the precoding resource block group size is not wideband.

14. The method in accordance with claim 12, further comprising determining a gap in the frequency domain between the first subset of resource blocks and the second subset of resource blocks, wherein decoding the PDSCH is based on the determined gap.

15. The method in accordance with claim 14, wherein determining the gap is based on a radio resource control (RRC) parameter, an indication associated with the DCI, or the set of resource blocks, or a combination thereof.

16. The method in accordance with claim 12, wherein a resource allocation type associated with the set of resource blocks comprises a downlink resource allocation type indicating in the DCI a starting resource block bundle index and a number of scheduled resource block bundles.

* * * * *